(12) United States Patent
Shen et al.

(10) Patent No.: US 7,251,649 B2
(45) Date of Patent: Jul. 31, 2007

(54) METHOD FOR PRIORITIZING CONTENT

(75) Inventors: Bo Shen, Fremont, CA (US); Susie Wee, Palo Alto, CA (US); Songqing Chen, Williamsburg, VA (US); Xiaodong Zhang, Williamsburg, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 527 days.

(21) Appl. No.: 10/698,669

(22) Filed: Oct. 31, 2003

(65) Prior Publication Data

US 2005/0097085 A1    May 5, 2005

(51) Int. Cl.
G06F 7/00 (2006.01)
(52) U.S. Cl. ............... 707/3; 707/104.1; 711/118; 711/133; 709/203
(58) Field of Classification Search .............. 707/3
See application file for complete search history.

(56) References Cited

U.S. PATENT DOCUMENTS

| | | | | |
|---|---|---|---|---|
| 6,260,061 | B1 * | 7/2001 | Krishnan et al. | 709/213 |
| 6,463,508 | B1 * | 10/2002 | Wolf et al. | 711/133 |
| 6,502,106 | B1 * | 12/2002 | Gampper et al. | 707/104.1 |
| 7,051,161 | B2 * | 5/2006 | Dixit et al. | 711/134 |
| 2001/0020248 | A1 * | 9/2001 | Banga et al. | 709/219 |
| 2004/0014469 | A1 * | 1/2004 | Lancieri | 455/422.1 |
| 2004/0098463 | A1 * | 5/2004 | Shen et al. | 709/213 |
| 2005/0060493 | A1 * | 3/2005 | Krissell et al. | 711/118 |

OTHER PUBLICATIONS

Chen Songqing et a—"Adaptive And Lazy Segmentation Based On Proxy Caching For Streaming Media Delivery"-Proc of Int'l Workshop on Network & Operating System Support Jun. 1, 2003.
Hao Chen et al.— "A New Proxy Caching Scheme For Parallel Video Servers"-ICCNMC 2003 Proceedings-Oct. 20, 2003-pp. 438-441.
Balafoutis E et al— Proxy Caching And Video Segmentation Based On Request Frequencies & Access Costs-IEEE vol. 2 Feb. 23, 2003 pp. 1367-1372.

* cited by examiner

*Primary Examiner*—Don Wong
*Assistant Examiner*—Binh V Ho

(57) ABSTRACT

Methods and systems for prioritizing content are described. A request for a first content object is received at a caching proxy. A search of an access log of the proxy cache for a portion of the first content object is then performed. The size of the portion of the first content object on the proxy cache is calculated and the normally utilized size of the segment of the first content object is derived. A comparison is then made between the size of the portion of the first content object on the proxy cache and the normally utilized size of the first content object requested.

9 Claims, 4 Drawing Sheets

METHOD FOR PRIORITIZING CONTENT

TECHNICAL FIELD

Embodiments of the present invention relate to content delivery networks. More specifically, embodiments of the present invention relate to caching proxies.

BACKGROUND ART

Before the widespread use of caching in the Internet, an item of content (a content object) requested by a client was likely provided by the original content server (the source of the content object). The content source and the client were typically located at a substantial distance from each other, which often led to slow response times, low bandwidths, high loss rates, and lack of scalability. Response times, bandwidths, and loss rates could also be significantly affected when multiple clients attempted to request an object from the content source at the same time.

Different forms of caching, such as content delivery networks, have helped to overcome some of these problems. Generally, content delivery networks place servers, which may be more specifically referred to as caching proxies, nearer to clients. Content objects can be replicated and cached at each of the caching proxies. Caching of content on caching proxies closer to clients has resulted in a number of improvements, including reduced response times, higher bandwidths, lower loss rates, improved scalability, and reduced requirements for network (backbone) resources.

Content delivery networks work well when the size of the content is relatively small in comparison to the size of the caches. For example, a Web page is generally much less than a megabyte in size. As such, this kind of content can be practically replicated at each caching proxy. Multiple instances of Web content can be stored on each caching proxy without the need for substantial memory resources, or without consuming a significant segment of available memory.

However, caching can be problematic due to the proliferation of multimedia content. Due to the large size of typical multimedia objects, a full-object caching strategy will quickly exhaust the cache space. That is, even a large cache can hold only a few items of multimedia content before getting filled. For example, a video of DVD (digital video disk) quality may be up to 4.7 gigabytes (GB) in size and up to two hours long (based on Moving Picture Expert Group-2 compression). Consequently, a 50 GB cache can hold only about ten DVD-quality videos. Thus, once the cache is filled, it is necessary to begin removing non-active objects from the cache in order to make room for an incoming object.

Presently, prefix caching and segment-based caching are the two techniques typically used to resolve the issue of a full proxy cache. In general, prefix caching works well when most clients access the initial segments of media objects. It also reduces startup latency by immediately serving the cached prefix from the proxy to the client while retrieving subsequent segments from the origin server. However, in prefix caching, the static determination of the prefix size plays a vital role in the system's performance.

In general, segment-based caching methods have been developed for increased flexibility. These methods also cache segments of media objects rather than entire media objects. Typically two types of segmentation strategies are used. The first type uses uniformly sized segments. For example, caching uniformly sized segments of layer-encoded video objects. The second type uses exponentially sized segments. In this strategy, media objects are segmented with increasing lengths; for example, the segment length may double. This strategy is based on the assumption that later segments of media objects are less likely to be accessed. In some cases, a combination of these methods may be utilized. That is, in which constant lengths and exponentially increased lengths are both considered. This type of method also favors the beginning segments of media objects.

However, the prefix and segmentation-based caching methods discussed herein do not address the following considerations. First, a users accesses to media objects typically represent a skewed pattern: most accesses are for a few popular objects, and these objects are likely to be watched in their entirety or near entirety. This is often true for movie content in a virtual office meetings and training videos in a corporation environment. That is, a heuristic segment-based caching strategy with a predefined segment size, exponential or uniform, which always favorably caches the beginning segments of media objects does not account for the fact that most accesses are targeted to a few popular objects.

Second, the access characteristics of media objects are dynamically changing. That is, the media object's popularity and most watched segments may vary with time. For example, some objects may be popular for an initial time period where most users access entire objects. Then, as the time goes on, there may be fewer requests for these objects and there may be fewer user accesses to the later segments of the objects. In this scenario, using a fixed strategy of caching several early segments may not work, since during the initial time period this may overload the network as later segments need to be retrieved frequently; then during the later time, caching all the initial segments may become wasteful of resources. This lack of adaptiveness in the existing proxy caching schemes may render proxy caching to be ineffective.

Accordingly, a more efficient way of caching content objects for end-users is desirable. Embodiments of the present invention provide such an improvement.

DISCLOSURE OF THE INVENTION

Embodiments of the present invention pertain to methods and systems for prioritizing content. A request for a first content object is received at a caching proxy. A search of an access log of the proxy cache for a portion of the first content object is then performed. The size of the portion of the first content object on the proxy cache is calculated and the normally utilized size of the segment of the first content object is derived. A comparison is then made between the size of the portion of the first content object on the proxy cache and the normally utilized size of the first content object requested.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
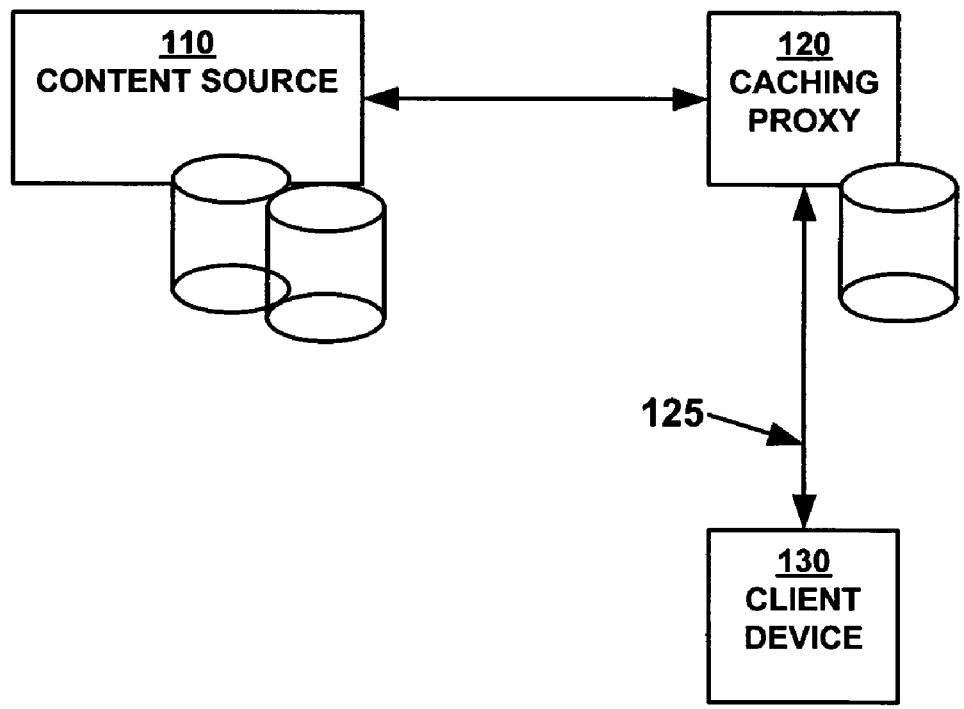
FIG. 1 illustrates a system for delivering content according to one embodiment of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

The embodiments of the present invention are well suited to use with video-based data, audio-based data, image-based data, Web page-based data, graphics data and the like that are generally referred to herein as media data, multimedia data, content, or content objects. For purposes of clarity and brevity, the following discussion and examples sometimes deal specifically with content objects. The embodiments of the present invention, however, are not limited to use with content objects.

In general, embodiments of the present invention utilize an adaptive and lazy segmentation based caching strategy, which responsively adapts to the real time accesses and lazily segments objects as late as possible for prioritizing content on a cache. Specifically, by utilizing an aggressive admission policy, a lazy segmentation strategy, and/or a two-phase iterative replacement policy, a proxy cache may be more efficiently utilized thereby reducing the need for a user to reach directly into a content source.

Embodiments of the present invention also dynamically adapt to change in object access patterns over time. For example, in common scenarios in which the popularity characteristics of media objects vary over time. The cache may automatically takes care of this situation without assuming a priori access pattern. That is, if users initially access a first portion of a content object, then the cache will maintain a copy of that first portion. However, if users then begin to watch focus on the tenth portion of a content object, the cache may recalculate the utility of the object in the cache and reassign the priority from the first portion to the tenth portion. Thus, if more space is needed on the cache, the first portion of the content object may be removed before the tenth portion. For example, by favorably caching the popular segments of media objects, regardless of their positions within the media object, network traffic may be reduced.

In addition, the embodiments of the present invention may adapt to different types of media objects. That is, media objects from different categories are treated fairly with the goal of maximizing caching efficiency. For example, if a large content object and a smaller content object are both taking up space on the cache, due to the iterative replacement policy, the object with the least utility will be replaced regardless of size. Therefore, the cache will remain at working capacity while also retaining the content objects of greatest utility. In addition, a utility function may be enacted to maximize the cache space. For example, the cache space may be favorably allocated to popular segments regardless of whether or not they are initial segments.

In addition to rating the utility of the content object, embodiments may further segment a content object based on actual access time to the content object. That is, the segment size of each content object may be decided adaptively based on the access history of the object recorded in real time. In so doing, the segment size of the content object may more accurately reflect client access behaviors. For example, the access history for an object may be collected by delaying the segmentation process. Thus, by initially caching the entire content object, and waiting for actual client usage prior to segmenting the object, a more realistic segmentation size may be utilized. Furthermore, segment admission and eviction policies may be adapted in real time based on these access records.

With reference now to FIG. 1, a network or system 100 for prioritizing content according to one embodiment of the present invention is shown. It is appreciated that system 100 may include elements other than those shown. System 100 may also include more than one of the various elements shown. The functionality of each of these elements is discussed below; it is appreciated that these elements may implement functionality other than that discussed.

In the present embodiment, the various elements of system 100 are in communication with each other as illustrated. That is, in the present embodiment, content source 110 communicates with caching proxy 120 (the terms cache proxy, or proxy cache may also be used), which in turn communicates with client device 130 via a communication channel 125. Generally speaking, caching proxy 120 is typically deployed at the edge of the network or system 100 to reduce traffic to and from content source 110, and to also reduce latency as perceived by client device 130.

Client device 130 may be a computer system (such as a laptop, desktop or notebook), a hand-held device (such as a personal digital assistant), a cell phone, or another type of device that, in general, provides the capability for users to access and execute (e.g., display) items of content. As mentioned above, there may actually be many client devices with access to caching proxy 120. In a heterogeneous network, each of these client devices may have different attributes or profiles. These attributes include, but are not limited to, the display, power, communication and computational capabilities and characteristics of the various client devices.

Communication may occur directly between elements, or indirectly through an intermediary device or node (not shown). Also, communication may be wired or wireless, or a combination of wired and wireless. In one embodiment, communication occurs over the World Wide Web (or Internet). There may actually be many communication channels downstream of caching proxy 120. In a heterogeneous network, each of these communication channels (exemplified by communication channel 125) may have different attributes. For example, one channel may be characterized as having a higher bandwidth (higher data transfer rate) than another channel.

Figure 2:
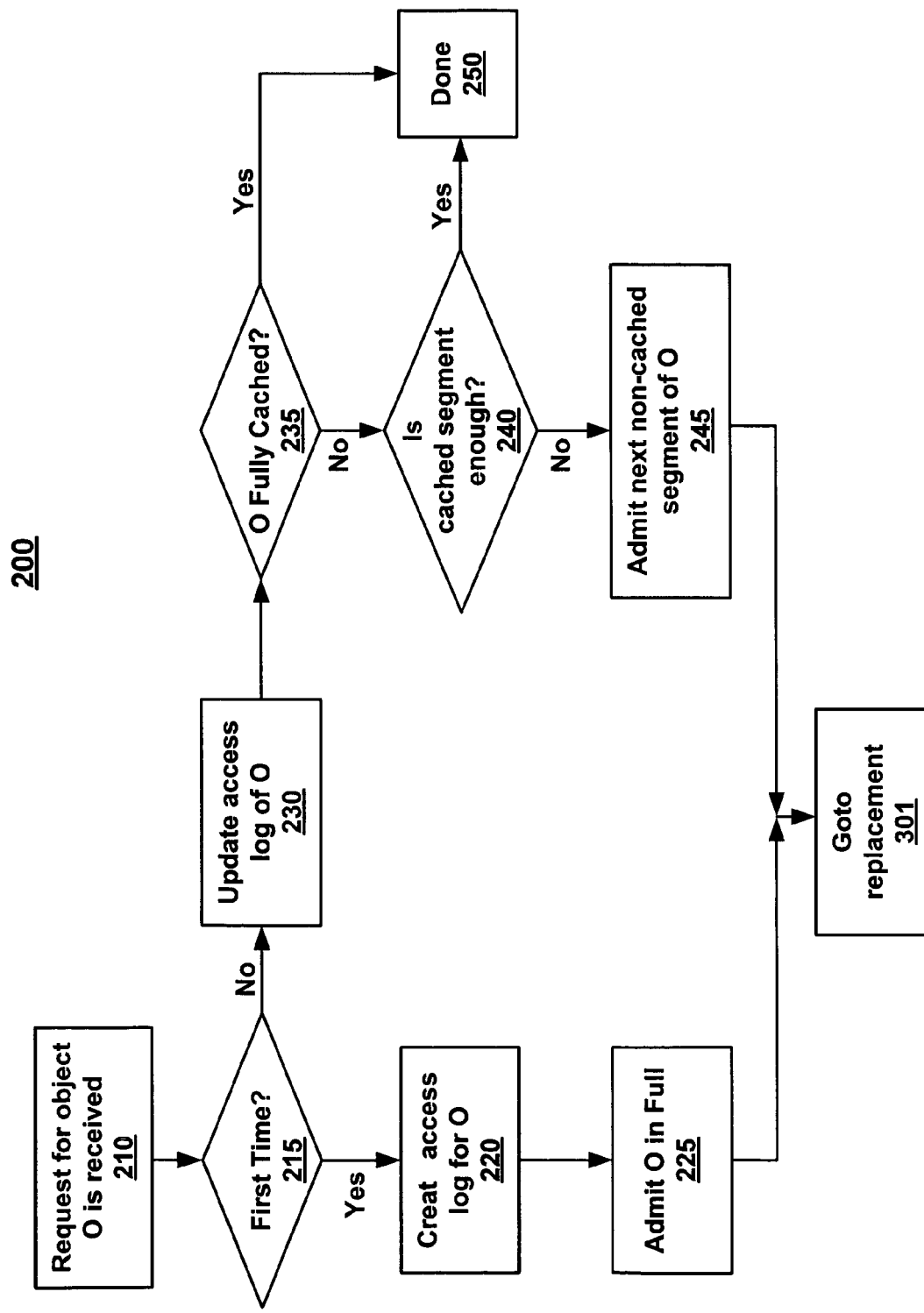
FIG. 2 is a flowchart for accessing an object in a cache according to one embodiment of the present invention.

FIG. 2 is a flowchart 200 of a method for accessing an object in a cache according to one embodiment of the present invention. Although specific steps are disclosed in flowchart 200, such steps are exemplary. That is, embodiments of the present invention are well suited to performing various other steps or variations of the steps recited in flowchart 200. It is appreciated that the steps in flowchart 200 may be performed in an order different than presented, and that not all of the steps in flowchart 200 may be performed. All of, or a segment of, the methods described by flowchart 200 may be implemented using computer-readable and computer-executable instructions which reside, for example, in computer-usable media of a computer system or like device. Generally, flowchart 200 is implemented by devices such as caching proxy 120 of FIG. 1.

In step 210 of FIG. 2, in the present embodiment, a request for a content object is received at a caching proxy from a client device (e.g., caching proxy 120 and client device 130 of FIG. 1). The request may be for a complete content object or only a portion of a content object (e.g., segment). As stated herein, a content object may be a video clip, audio clip, video meeting, graphics, media, or the like.

In step 215 of FIG. 2, the caching proxy evaluates whether or not the content object has been previously accessed through the proxy. For example, caching proxy may check (e.g., search, extrapolate, compare, etc.) a data structure such as an access log for a prior entry regarding the content object requested. Although the term object is used in one embodiment, it is appreciated that the term object (or content object) may refer to a complete content object, a segment of content object, a portion of content object, or the like.

In one embodiment, the data structure may include:

$T_1$: the time instance the object is accessed for the first time;

$T_r$: the latest reference time to the object or segment (it is equal to $T_1$ when the object is accessed for the first time);

$T_c$: time of now;

$L_{sum}$: the sum of the duration of each access to the object or segment;

n: the number of accesses to the object or segment;

$L_b$: the length of the base segment; and $n_s$: the number of the cached segments of the object.

In one embodiment, the quantities $T_r$, $L_{sum}$, n and $n_s$ may be dynamically updated upon each access arrival, $L_{sum}$ may be updated upon each session termination, and $L_b$ may be decided when the object is segmented for the first time. It is appreciated that the data structure may contain more or less than the items listed herein. The specific items stated herein are merely one embodiment of possible items in a data structure which may perform the method described herein.

In addition, the following quantities may be derived from the data entries described herein and utilized as measurements of access activities of the content object. Frequency of access (F) may be derived utilizing the number of accesses (n) divided by the latest reference time ($T_r$) minus the time instance of first access ($T_1$). Also, the average access duration ($L_{avg}$) may be defined as the sum of the duration of each access ($L_{sum}$) divided by the number of accesses (n).

In step 220 of FIG. 2, if this is the first time the client device 130 has received a request for the content object, the access log may contain no information about the content object, and an access log entry may be created for the content object. The access log entry may include, but is not limited to, many of the data structure categories stated herein.

In step 225 of FIG. 2, the cache proxy then prepares to admit the requested content object to the cache. Initially, each content object may be fully cached when it is accessed for the very first time. The fully cached object may then be kept in the cache until it is chosen as an eviction victim by the replacement process described in detail herein.

In general, in order for the cache proxy to admit the requested content object, the cache proxy must determine if there is room for the entire content object in order to put it directly into the cache. That is, once the proxy knows the full length of the object, sufficient cache space needs to be allocated. If there is not enough free space on the proxy cache, then space may be made through the adaptive replacement process outlined in detail herein.

In step 230 of FIG. 2, if the access log contains some information about the content object that implies that the content object has been previously accessed by the cache proxy. In that case, the access log may be updated to show the latest request for the content object.

In step 235 of FIG. 2, the status of the content object is evaluated utilizing the metrics of the access log data structure. That is, whether or not the content object is fully cached on the proxy cache. If it is fully cached, then no further admission of the content object is necessary and step 250 is performed. That is, no other action is necessary.

In step 240 of FIG. 2, if the content object is not fully cached and instead only segments are in the cache, then an analysis of whether or not the segments on the cache are enough (or the right segments) for the request, or if more segments of the content object are necessary. For example, if the access log indicates that there are $n_s$ segments cached, the system will consider whether it is necessary to cache the next segment ($n_s$+1). One method for determining the need is the equation:

$$L_{avg} > (n_s+1)L_b/a$$

where 'a' is a metric or constant used to help determine how much of the object (e.g., how many segments) are kept in the cache proxy. That is, 'a' is related to the caching proxies ability to reduce serverlink traffic. By utilizing a certain 'a' value for an object, startup delay to the user may be reduced (e.g., buffer size, etc). For example, if 'a'=2 then a two segment minimum in the proxy cache is necessary to ensure the client device 130 receives a minimal startup delay.

Thus, the inequality indicates that if the average access duration is less (or shorter) than the average accessed length of the content object no further admission is necessary to the cache and the proxy cache again goes to step 250. That is, no further action is necessary.

However, in step 245 of FIG. 2, if the average access duration is greater (or longer) than the average accessed length of the content object then a further segment may be needed. That is, if the average access duration is increasing to the extent that the cached $n_s$ segments can not cover most of the request, a consideration for the admission of the next not-cached segment should be made.

In step 301 of FIG. 2, in general, the cache proxy must determine if there is room in the cache for the next segment of content object. That is, sufficient cache space is allocated. If there is not enough space, then space may be made through the adaptive replacement process outlined in detail herein.

Figure 3:
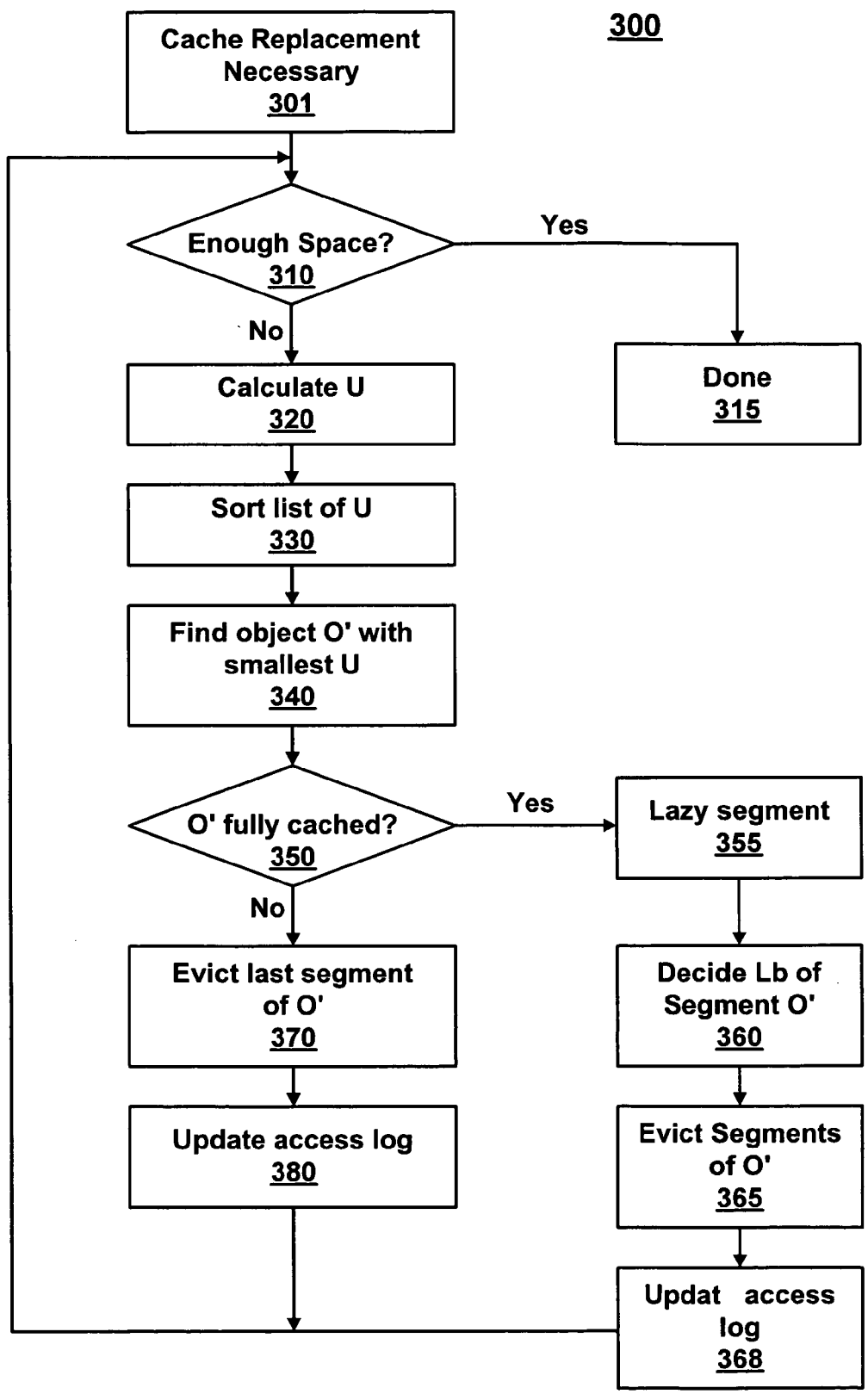
FIG. 3 is a flowchart of object replacement in a cache according to one embodiment of the present invention.

With reference now to FIG. 3, a flowchart 300 of a method for object replacement in a cache is shown according to one embodiment of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all, of the steps in flowchart 300 may be performed. All of, or a segment of, the methods described by flowchart 300 may be implemented using computer-readable and computer-executable instructions which reside, for example, in computer-usable media of a computer system or like device. Generally, flowchart 300 is implemented by devices such as caching proxy 120 of FIG. 1.

In general, a lazy segmentation strategy is utilized once there is no cache space available and a new object is in need of placement on the cache proxy. The replacement policy calculates the caching utility of each object, and inactive objects with the smallest utility value are chosen as the victim. If the victim object is an object which has not been segmented and is currently cached in full, the proxy segments the object. In one embodiment, the object is segmented to a specific length ($L_b$) based on the average access duration ($L_{avg}$). Once the value of $L_b$ is determined, it will remain fixed for each segment of the specific content object. After segmentation occurs, the first m segments are kept in cache while the rest are evicted. The number of cached segments is then recorded in the access log.

If a later request requires more than the number of cached segments, the data scheduled to be prefetched from the content source 110 will be fetched in segments of length $L_b$ except for the last segment which may be shorter. For example, if $L_b$ is size 3 and the data needing to be prefetched is of size 5, then a segment of size 3 and a segment of size 2 will be fetched from content source 110 and stored on caching proxy 120.

Thus, this method differs from other segmentation strategies in which the segmentation is performed when the object is accessed the first time. That is, lazy segmentation delays the segmentation process as long as possible, thereby allowing the collection of sufficient amounts of accessing statistics to aid in the accuracy of the segmentation process. Therefore, lazy segmentation may set different segment lengths for different objects according to the real time user access behavior.

In step 310 of FIG. 3, the cache proxy must determine if there is room in the cache for the next segment of content object. That is, if sufficient cache space is available for the content object to be added. If there is enough room to add the content object (either a portion or the total object, as described in detail in FIG. 2), then step 315 of FIG. 3 is performed. That is, the content object is added to the proxy cache without prejudice.

In step 320 of FIG. 3, if, however, there is not enough space on the proxy cache 120 for the content object, then space may be made through the adaptive replacement process. That is, the utility (U) of the objects in the proxy cache 120 may be calculated. In one embodiment, the utility function may rely on several factors to derive a result for the victim selection process. For example, the utility calculation may consider the number of accesses (n), the duration of accesses, the length of cached data ($n_s*L_b$) (which is the cost of storage), and the probability of future accesses. In one embodiment, the probability of future accesses may compare the time interval between now and the most recent access ($T_c-T_r$) and the average time interval for an access happening in the past (($T_r-T_1$)/n) where $T_c$ is the time now. For example, if ($T_c-T_r$)>($T_r-T_1$)/n then the possibility for a new request arriving soon for the object is small. Otherwise it is highly possible that a request is coming soon.

In one embodiment, the caching utility of an object or segment is proportional to the number of future accesses, the average duration of the accesses, and the probability of the accesses. In addition, it may be inversely proportional to the object or segment size. Therefore, utility may be defined as:

$$\frac{\left(\frac{L_{avg}}{n}\right)*(F)*\text{MIN}\left\{1, \frac{\frac{T_r-T_1}{n}}{T_c-T_r}\right\}}{(n_s*L_b)}$$

Where:

$L_{avg}/n$: estimates the average duration of future accesses;
(F): estimates the average number of future accesses;
MIN $(1,(((T_r-T_1)/n)/(T_c-T_r)))$: denotes the possibility of future accesses; and
($n_s*L_b$): is the cost of disk storage.

Thus, the utility function provides a more accurate estimation about the popularity of the segments regardless of their relative position within the content object. Thereby helping to ensure that less popular segments are the ones evicted from the cache. However, there are a plurality of possible calculations and variables which may be utilized to assign a utility rating for a content object. The use of the present variables are merely one of the many possible embodiments and are utilized for brevity.

In step 330 of FIG. 3, a list of the objects on the proxy cache is sorted based on the previously mentioned utility factors. In step 340, the object with the smallest utility factor (O') is found and in step 350 an analysis of the access log of O' is performed in order to establish which of the two-phases the cached object O' is stored under. That is, whether O' is fully cached or already segmented on the proxy cache 120.

In step 355 of FIG. 3, if content object O' is fully cached the lazy segmentation process described herein is initiated. One embodiment of the steps utilized in lazy segmentation are covered in steps 360-368 of FIG. 3. The 3 steps stated herein are for purposes of clarity. It is appreciated that there may be more or fewer steps performed by the present invention.

In step 360 of FIG. 3, the length of the base segment ($L_b$) is decided. This length is based on the average access duration ($L_{avg}$). For example, if the object has been accessed five previous times and the average access length was 7 seconds, then the $L_{avg}$ may be 7 seconds. In another embodiment, it may be a multiple of 7 seconds (e.g., 14, 21, etc.) or a fraction (e.g., 3.5, 1.75, etc.) or it may be measured in size (e.g., bytes) instead of length.

In step 365 of FIG. 3, a number of segments (a) of O' are kept and the rest of the segments of O' are evicted from the cache. In one embodiment, the number of segments of O' which are kept may be the number with the highest utility calculations. For example, if O' is segmented into 1.5 second segments and the middle 3 seconds have the highest utility value, then there may be 2 (a) segments of O' remaining in the cache and the rest of O' would be removed.

In step 368 of FIG. 3, the access log is then updated. In one embodiment, the update may be complete to include the number of cached segments of the object ($n_s$), the latest reference time ($T_r$) of the object or segments, and the length of the base segment ($L_b$). After the access log is updated the process loops back to step 310 of FIG. 3. That is, the cache is checked to see if enough free space exists to admit the necessary content object. As stated herein, if there is enough room, then the object is admitted and the process is done, if not, then step 320 of FIG. 3.

With reference again to step 350 of FIG. 3, if object O' is already segmented on the proxy cache 120 then step 370.

In step 370 of FIG. 3, if content object O' is already segmented and it has shown up with the smallest utility value, then the last segment or segments of object O' are evicted from the cache.

In step 380, the access log is updated. In one embodiment, the update may be complete to include the number of cached segments of the object ($n_s$) remaining in the cache (e.g., zero). After the access log is updated the process loops back to step 310 of FIG. 3. That is, the cache is checked to see if enough free space exists to admit the necessary content object. As stated herein, if there is enough room, then the object is admitted and the process is complete, if not, then step 320 of FIG. 3.

Thus, even after an object is fully replaced, the access history of the object may remain in the access log. Therefore, when the media object is accessed again, instead of it being fully cached, the cache proxy may initially only cache the amount of object content shown in its logs as the average access duration.

Figure 4:
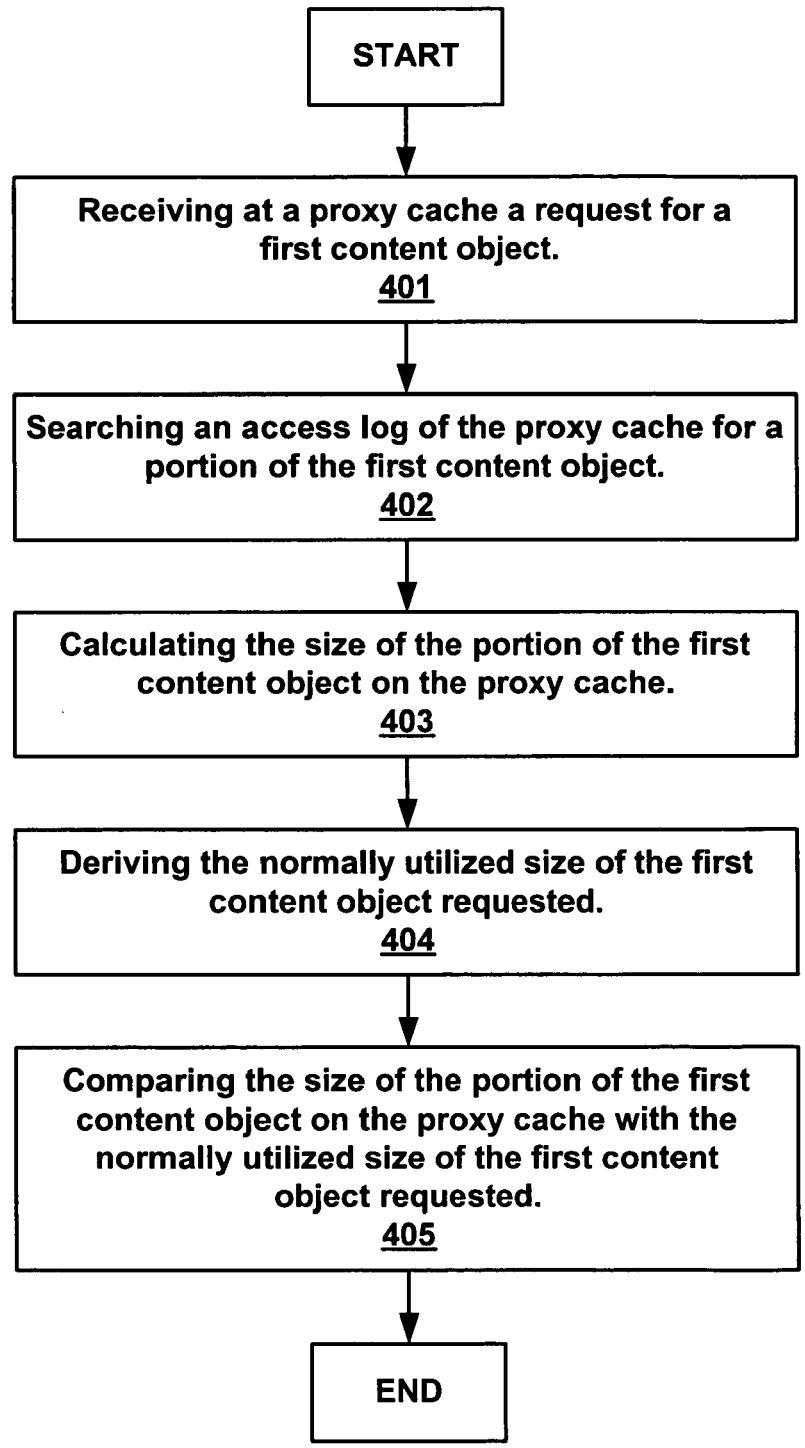
FIG. 4 is a flowchart of a method for prioritizing content according to one embodiment of the present invention.

FIG. 4 is a flowchart 400 of a method for prioritizing content according to one embodiment of the present invention. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed. All of, or a portion of, the methods described by flowchart 400 may be implemented using computer-readable and computer-executable instructions which reside, for example, in computer-usable media of a computer system or like device. Generally, flowchart 400 is implemented by devices such as caching proxy 120 of FIG. 1.

In step 401 of FIG. 4, a request for a first content object is received at a proxy cache. As stated herein, the request may be from client device 130. Furthermore, the content object may be a media object or any other object which may be received from a content source 110.

In step 402 of FIG. 4, the access log of the proxy cache is searched for a portion of the first content object. In one embodiment, the portion of the first content object is an access log entry.

In step 403 of FIG. 4, the size of the portion of the first content object on the proxy cache is calculated. That is, the cache proxy may have no entry regarding the first content object and therefore none of the first content object on the cache, a portion of the first content object (e.g., a segment or group of segments), or the entire object on the cache unsegmented.

In step 404 of FIG. 4, the normally utilized size of the first content object is derived. For example, if the object has never been accessed before then it is the full size of the object. However, if it has been accessed before, then the size of the normally utilized portion is found by taking the average of each of the times it was viewed (e.g., average access duration).

In step 405 of FIG. 4, the size of the portion of the first content object on the proxy cache is compared with the normally utilized size of the first content object requested. That is, a comparison is made to find whether step 403 or 404 is larger. If step 403 is larger then there is no need for the proxy cache to import any more or the first object requested at this time. However, if step 404 is larger, then a further portion (e.g., segment) of the first object is needed and cache proxy 120 must access content source 110 to import more of the first object.

Thus, adaptive and lazy segmentation strategy may outperform both the exponential and the uniform segmentation methods by about 30% in byte hit ratio on average, which represents a server workload and network traffic reduction of 30%.

In summary, embodiments of the present invention pertain to methods and systems for prioritizing content. According to these embodiments—providing an access log of the proxy cache, the size of the portion of the first content object on the proxy cache may be calculated and the normally utilized size of the segment of the first content object may be derived. A comparison may then made between the size of the portion of the first content, object on the proxy cache and the normally utilized size of the first content object requested. Thus, a more efficient utilization of cache memory may be utilized.

Embodiments of the present invention are thus described. While the present invention has been described in particular embodiments, it should be appreciated that the present invention should not be construed as limited by such embodiments, but rather construed according to the following claims.

What is claimed is:

1. A method of prioritizing content, said method comprising:

receiving at a proxy cache a request for a first content object;

searching an access log of said proxy cache for a portion of said first content object; finding at least one segment of said portion of said first content object on said proxy cache;

calculating a size of said portion of said first content object on said proxy cache;

deriving a normally utilized size of said first content object requested, wherein said normally utilized size is based on average of times said first content object was requested, the deriving the normally utilized size of said first content object requested comprises: utilizing said access log of said proxy cache to establish an average view length of said first content object;

comparing the size of said portion of said first content object on said proxy cache with the normally utilized size of said first content object requested, wherein said first content object is prioritized based on said comparison;

admitting the at least one segment of said first content object to said proxy cache if said normally utilized size is greater than the size of said portion of said first content object on said proxy cache;

denying the at least one segment of said first content object to said proxy cache if said normally utilized size is less than the size of said portion of said first content object on said proxy cache;

checking available cache space on said proxy cache for room to admit a further segment of said first content object;

making room on said proxy cache for said further segment of said first content object;

wherein said making room on said proxy cache comprises:

calculating a utility value for other content objects on said proxy cache;

prioritizing said other content objects based on said utility value;

selecting one of said other content objects with a smallest utility value;

removing a lowest priority portion of said other content object with the smallest utility value on said proxy cache;

admitting said further segment of said first content object to said proxy cache;

segmenting said one of said other content objects with the smallest utility value based on a previous duration of access to said one of said other content objects with the smallest utility value if said one other content object of said other content objects with the smallest utility value is fully cached;

removing all segments of said one of said other content objects with the smallest utility value if said one of said other content objects with the smallest utility value is not fully cached.

2. The method of claim 1 comprising:

receiving said request for said first content object from a client device.

3. The method of claim 1 wherein the calculating the size of said portion of said first content object on said proxy cache comprises:

counting a total number of segments of said portion of said first content object cached on said proxy cache;

measuring a length of said total number of segments of said portion of said first content object;

and multiplying said total number of segments with said length of said segments of said first content object.

4. The method of claim 1 wherein the deriving the normally utilized size of said first content object requested comprises:

utilizing said access log of said proxy cache to establish an average view length of said first content object.

5. The method of claim 1 wherein said method comprises:

admitting no further portion of said first content object to said proxy cache if said normally utilized size is less than the size of said portion of said first content object on said proxy cache.

6. A computer-readable storage medium having computer-readable program code embodied therein for causing a caching proxy to perform a method of prioritizing content, said method comprising:

receiving at a proxy cache a request for a first content object;

searching an access log of said proxy cache for said first content object;

finding at least one segment of said first content object on said proxy cache;

calculating a size of said first content object on said proxy cache;

utilizing said access log of said proxy cache to establish an average view length of said first content object;

calculating the average view length of the segment of said first content object requested;

comparing the size of said first content object on said proxy cache and the average view length of said first content object requested;

denying the at least one segment of said first content object to said proxy cache if said average view length is less than the size of said first content object on said proxy cache;

admitting the at least one segment of said first content object to said proxy cache if said average view length is greater than the size of said first content object on said proxy cache;

checking available cache space on said proxy cache for room to admit said further segment of said first content object;

calculating a utility value for other content objects on said proxy cache;

prioritizing said other content objects based on said utility value;

selecting one of said other content objects with a smallest utility value;

removing portions of lowest priority of said other content objects with the smallest utility value on said proxy cache;

admitting said further segment of said first content object to said proxy cache;

segmenting said one of said other content objects with the smallest utility value based on a previous duration of access to said one of said other content objects with the smallest utility value if said one of said other content objects with the smallest utility value is fully cached;

removing all segments of said one of said other content objects with the smallest utility value if said one of said other content objects with the smallest utility value is not fully cached.

7. The computer-readable storage medium of claim 6 wherein said computer-readable program code embodied therein causes a caching proxy to perform a method of prioritizing content, said method comprising:

receiving said request for said first content object from an end user.

8. The computer-readable storage medium of claim 6 wherein said computer-readable program code embodied therein causes a caching proxy to perform a method of prioritizing content, said method comprising:

finding a total number of said at least one segment of said first content object cached on said proxy cache;

measuring a length of said at least one segment of said first content object;

and multiplying said total number of cached segments with said length of said at least one segment of said first content object.

9. The computer-readable storage medium of claim 6 wherein said computer-readable program code embodied therein causes a caching proxy to perform a method of prioritizing content, said method comprising:

utilizing said access log of said proxy cache to establish an average view length of said first content object.

* * * * *